United States Patent Office 3,398,306
Patented Aug. 20, 1968

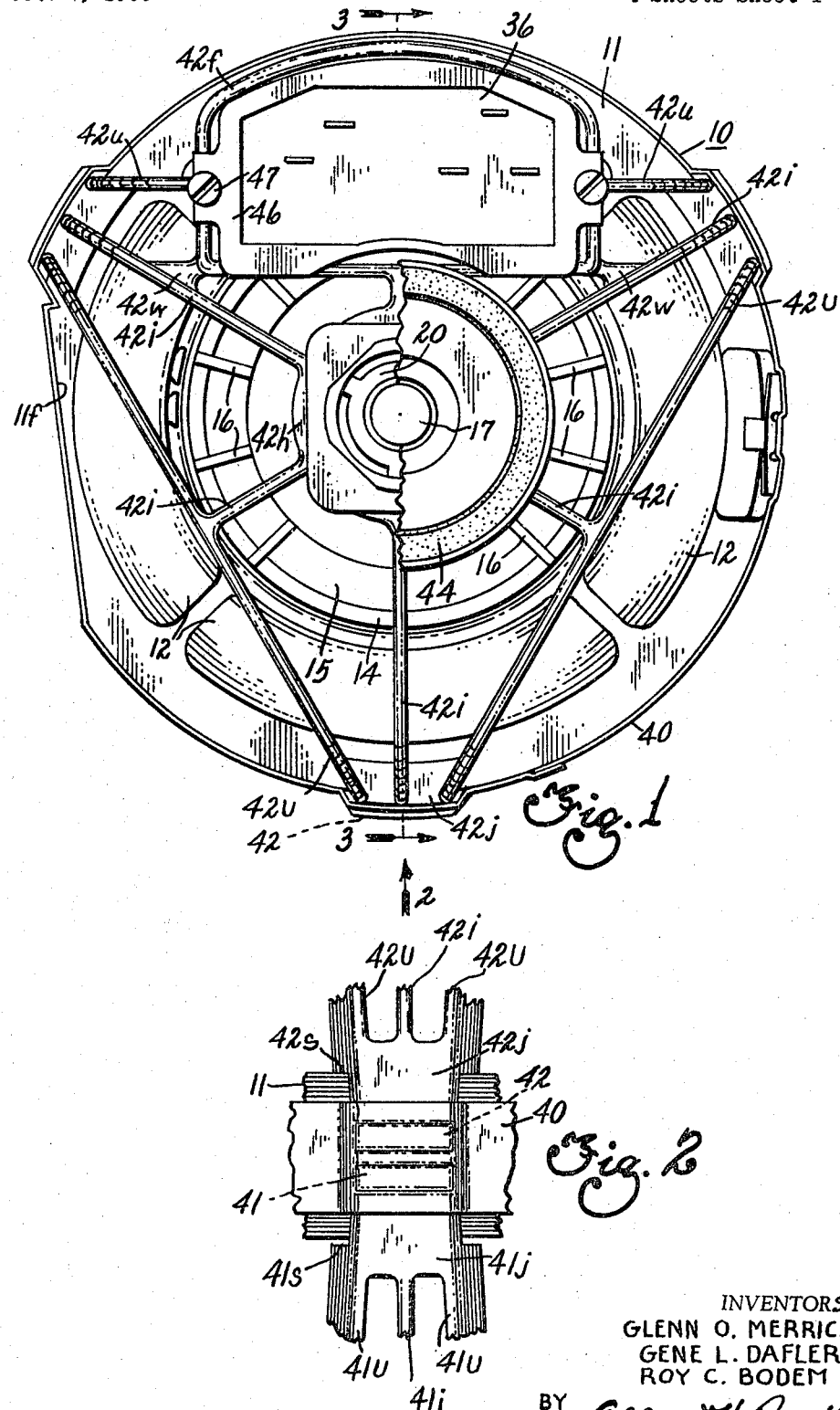

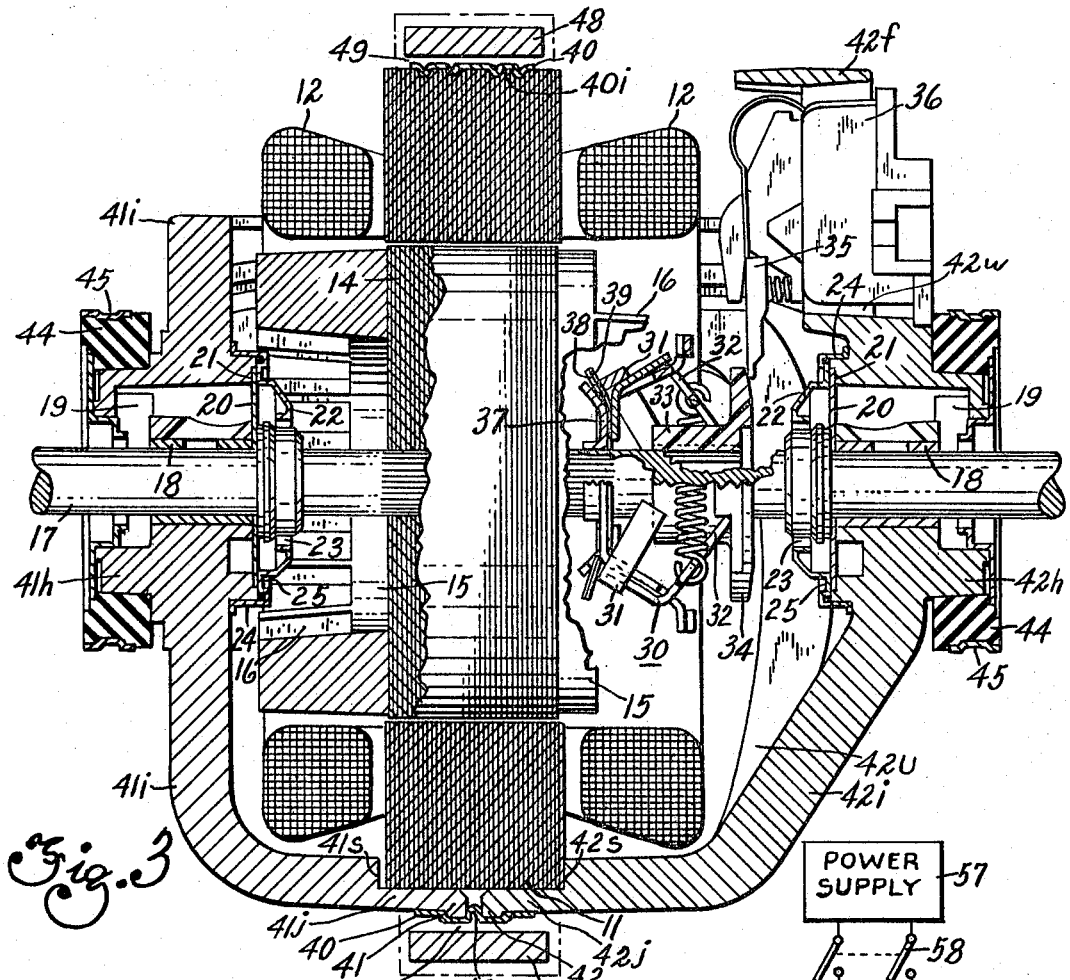

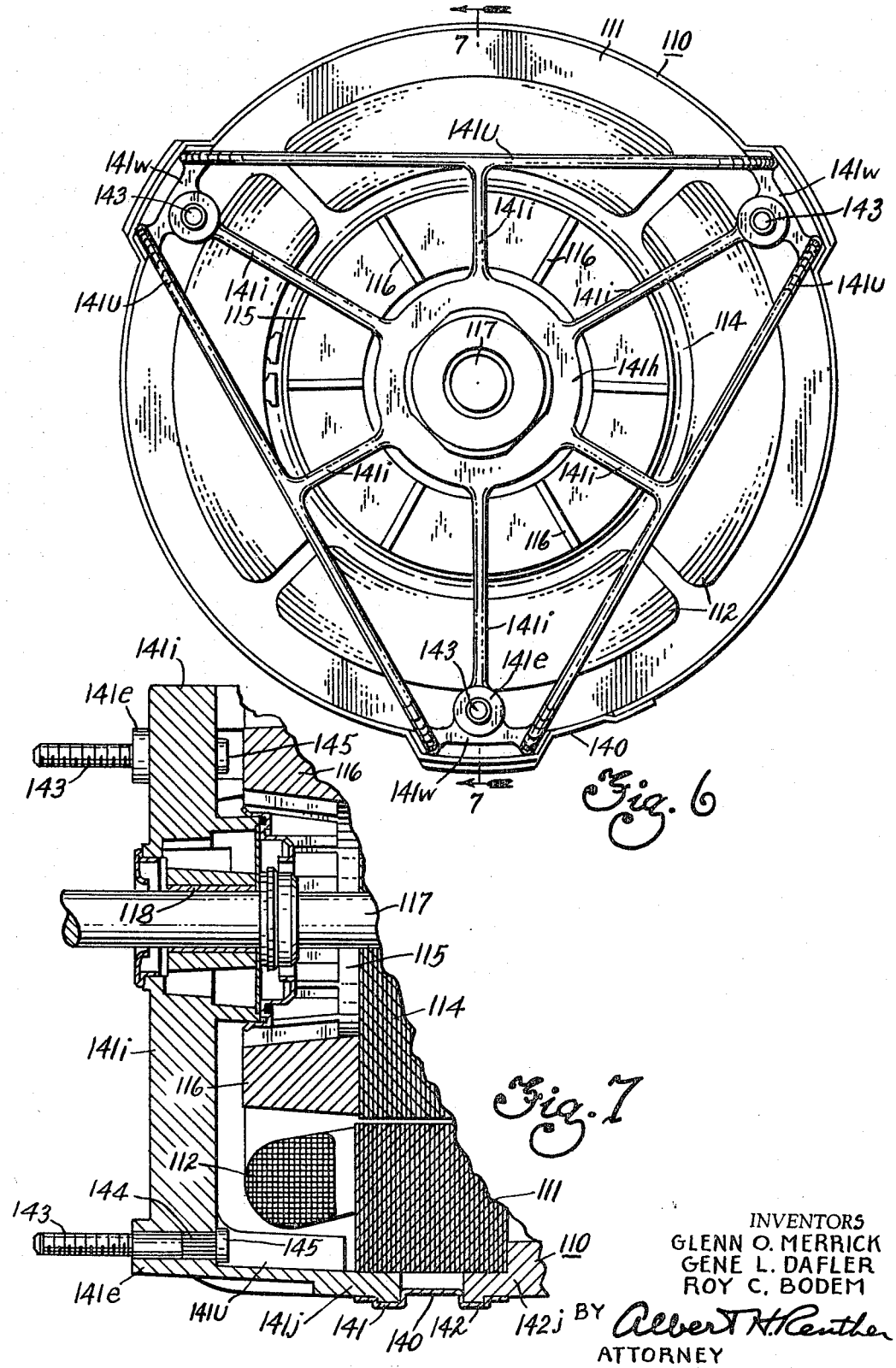

3,398,306
STATOR FRAME ASSEMBLY AND STRUCTURE
Glenn O. Merrick, Dayton, Gene L. Dafler, New Lebanon, and Roy C. Bodem, Kettering, Ohio, assignors to General Motors Corporation, Detroit, Mich., a corporation of Delaware
Filed Oct. 7, 1965, Ser. No. 493,770
7 Claims. (Cl. 310—258)

ABSTRACT OF THE DISCLOSURE

A stator frame assembly comprised of a pair of end frames, wherein, each frame is constructed of a plurality of stabilizing struts having predetermined junctures juxtaposed in locations radially outward on a magnetic core, and having open spaces for cooling between the struts. The end frames and magnetic core are secured together by a metal band complementary to the junctures and the periphery of the magnetic core.

---

This invention relates to dynamoelectric machine assembly, and more particularly, to stator frame structure thereof.

During manufacture of fractional horsepower motors, various approaches are used to achieve greater material savings though structurally improvements are sought which are economically feasible. Problems of welding and maintaining tolerances are encountered as are cooling or ventilating considerations. Accordingly, an object of the present invention is to provide a new and improved stator frame assembly and structure including magnetically-formed banding that interlocks with predetermined stator end frame components directly on magnetic stator core periphery.

Another object of the present invention is to provide stator frame assembly and structure including generally triangular shaped end frames including strut portions in spacing that is open laterally outwardly from a central hub portion and terminating axially in an undercut flange means complementary to a magnetic stator core around which magnetically-formed banding is secured in tight interlock therewith.

Another object of this invention is to provide stator frame structure which includes generally open cooling spaces between strut portions at least forming triangular cornering having threaded mounting lugs projecting axially therefrom for mounting purposes. The lugs have die cast interlock with triangular corners of the end frame structure that collectively is generally triangular as well as squared for a range of between three and four mounting lugs.

A further object of this invention is to provide stator frame structure which includes at least three U-shaped strut portions that meet at junctures having laterally outwardly extending abutments which are located on outer periphery of a laminated stator magnetic core. The abutments are collectively in pairs from opposite ends and a magnetically-formed metal banding is tightly in snug engagement thereon as well as on the outer periphery of the laminated stator magnetic core. The banding under force complements irregular lamination periphery as well as abutments at the junctures. The U-shaped strut portions have intermediate struts therebetween in open spacing for free-access ventilation including cooling of windings and joined to a central mounting hub means. The laminated stator magnetic core has at least one flat side complemented by the banding and adapted to enhance mounting.

Another object of this invention is to provide procedure or method of fabricating fractional horsepower motors. Electromagnetic forming means when energized and operated effect a counter magnetic flux in opposition to move a stator banding structure as a work piece into engagement with a stator magnetic core during positioning of die cast strutted end frame abutments therewith. Holding of the strutted end frame abutments by the banding occurs effectively with a minimum of material. Through bolts, welding and other extraneous parts and methods are eliminated.

Further objects and advantages of the present invention will be apparent from the following description, reference being had to the accompanying drawings wherein preferred embodiments of the present invention are clearly shown.

In the drawings:

FIGURE 1 is an end plan view of a dynamoelectric machine assembly having features in accordance with the present invention.

FIGURE 2 is a fragmentary plan view of a portion of the assembly taken in the direction of arrow 2 in FIGURE 1.

FIGURE 3 is a cross-sectioned elevational view taken along line 3—3 in FIGURE 1.

FIGURE 4 is a perspective view of features for the dynamoelectric machine assembly of FIGURE 1.

FIGURE 5 is a diagrammatic view of an electrical circuit for practicing the magnetically-formed dynamoelectric machine stator structure banding in accordance with the present invention.

FIGURE 6 is an end plan view of dynamoelectric machine assembly having features in accordance with the present invention and added mounting lugs extending axially thereof.

FIGURE 7 is a fragmentary cross-sectional elevational view taken along line 7—7 in FIGURE 6.

Figure 8:
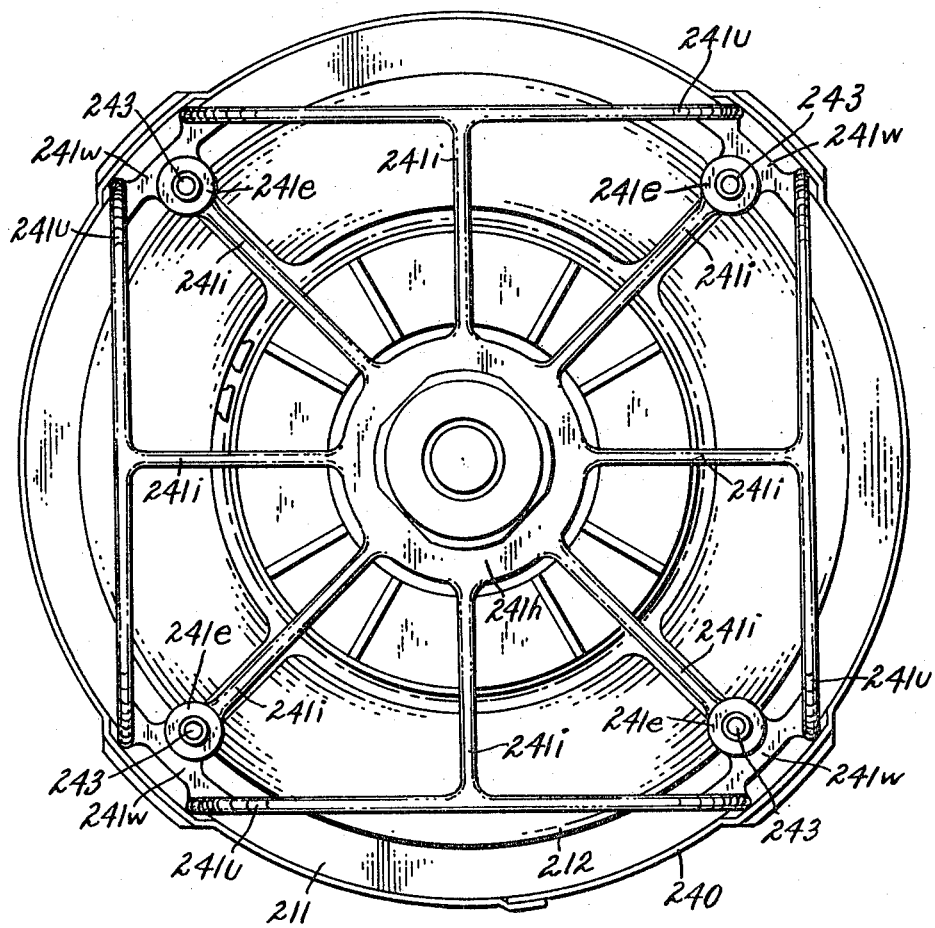
FIGURE 8 is another end plan view of dynamoelectric machine assembly having features in accordance with the present invention with further mounting lugs extending axially thereof.

In FIGURE 1 there is a dynamoelectric machine assembly generally indicated by numeral 10 having a laminated stator magnetic core 11 with winding means 12 thereon in a well known manner. The steel or sheet metal laminations forming the magnetic core 11 are slotted as represented by reference 11s in FIGURE 4 with suitable insulation 11i therein. Each of the laminations has a flattened edging 11f that permits a flush mounting either horizontally or vertically and otherwise as required. A laminated rotor portion 14 represented in views of FIGURES 1, 3 and 4 has a cast metal squirrel cage winding in a well known manner including integral end ring means 15 as well as axially extending and radially located cooling fins or blades 16. The laminated rotor 14 is carried on a shaft 17 journalled by sleeve bearing means 18 adjacent to which a lubricating cavity 19 is provided on each of opposite ends. This lubricating cavity is filled with a suitable wicking (not shown) from which lubricant exudes to the sleeve bearing means through suitable radial passages indicated in FIGURE 3.

On one side of each of the lubricating cavities there is an X-shaped thrust plate 20 which fits into an annular recess 21 of a cast metal hub portion that forms the cavities 19 as well as radial spoke support for the sleeve bearing means 18. An oil or lubricant cover 22 having a central opening 23 and an outer edging 24 as well as an intermediate axial depression 25 is fitted to the recessed hub portion. Reference is made to a copending disclosure of Ser. No. 493,763 filed concurrently herewith in which further reference is made to the oil or lubricating cover as well as thrust plate. The depression 25 is crimped into the recessing except for bumps formed by outer ends of the X-shaped thrust plates 20 such that each thrust plate is prevented from turning once the oil cover is crimped into place and snuggly press fitted along edging 24 thereof into engagement with the hub portion at each end. It is to be understood that the X-shaped thrust plate 20 also can have three radial outer ends rather than four as fitted into the hub recessing subject to crimping of the oil cover of metal axially thereto.

Also shown in FIGURE 3 is a snap acting speed responsive device generally indicated by numeral 30 which operates in accordance with a disclosure of Patent 2,747,854—Schnepf issued May 29, 1956 to the assignee of the present invention. This speed responsive device 30 includes weights 31 secured to one end of arms 32 in engagement with an axially shiftable sleeve 33 having a radial flange 34 which engages a switch arm 35. Switch and terminal block means 36 shown in views of FIGURES 1 and 3 are provided in a well known manner. Reference is made to disclosure of copending application Ser. No. 493,763, filed Oct. 7, 1965 as to provision of a backing member 37 as well as C-shaped spring means 38 and a plastic plate 39 for the speed responsive device. The C-shaped spring means 38 and plastic plate 39 serve as part of a resilient snubber structure for speed responsive or governor assembly.

FIGURES 1–4 inclusive show a metal banding 40 which is magnetically formed onto outer periphery of the laminated stator core as well as over abutments 41 and 42 of end frame junctures. These junctures represented by reference 41j and 42j respectively are made of die cast metal including shoulders 41s and 42s respectively which fits directly against outer periphery of the laminated stator core 11 as best seen in views of FIGURES 3 and 4. The abutments 41 and 42 respectively at each of the junctures protrude laterally or radially outwardly subject to direct engagement thereby as banding 40 of steel, aluminum and other ductile though strong metal is magnetically formed and forced into tight peripheral engagement therewith. Tightness of the banding 40 due to magnetic-forming is such that inner periphery conforms to and complements the irregularities of the laminated core 11. Rigidity of the end frame structure is achieved by provision of substantially U-shaped struts 41U and 42U. There are three struts 41U on one side and two struts 42U on an opposite side of the end frame means with a third strut portion 42u being interrupted by a further strut-like flange or box framing 42f surrounding the terminal block and switch mounting 36. Further intermediate strut portions 41i and 42i interconnect junctures 41j and 42j to central hub portions 41h and 42h respectively. These intermediate strut portions 42i extend substantially radially outwardly and increase rigidity of end frame means as formed by struts per se collectively. It is noted and emphasized that all remaining end frame space between such struts is completely open for full cooling and ventilation of winding means 12 as well as the rotor 14.

The hub portions 41h and 42h have elastomeric annular resilient mountings 44 located radially outwardly on one side thereof. These resilient mountings 44 have a metal banding 45 thereon to receive brackets secured to a mounting panel (not shown) which is located to be coplanar with the flattened edging 11f for example. Reference is made to a Patent 2,296,221—Pontis issued Sept. 15, 1942 to the assignee of the present invention as an example of such resilient mounting.

As to electrical energization of the dynamoelectric machine means 10 it is noted that the terminal board and switching means represented by reference numerals 36 are secured by a bracket 46 as well as screws or fasteners 47. The frame strut portion 42f is further stabilized by webs 42w as can be seen particularly in FIGURE 1. The banding 40 conforms tightly to the radially or laterally outwardly extending abutments 41 and 42 in each of the locations of junctures which are juxtaposed as represented in FIGURES 2 and 4 of the drawings.

As to procedure or method of fabricating dynamoelectric machines or fractional horsepower motors in accordance with the present invention, the first step is thus the positioning of the end frame means with struts and junctures in juxtaposed locations as best illustrated in FIGURE 4. Next the motor components including the abutments 41 and 42 as well as the laminated stator core 11 and banding 40 are positioned concentrically and radially inwardly from a magnetic coil means 48 represented in views of FIGURES 3 and 5 of the drawings. An opening or annular space 49 exists between such magnetic coil means 48 and the banding 40 as indicated in FIGURE 3. In the event a flattened edging 11f is provided the magnetic coil means 48 and space or gap 49 can be arranged complementary thereto to assure proper banding at tight fit. The magnetic coil means 48 is part of a magnetic forming circuit generally indicated by numeral 50 such as is illustrated in FIGURE 5 of the drawings. This circuit includes the magnetic coil means 48 which is conditioned by closing a switch 51 therein having one terminal thereof connected to a conductor 52 to the coil means 48 and an opposite terminal thereof connected to a conductor 54 connected to a capacitor bank 56. The capacitor bank 56 is charged from a power supply 57 when a switching means 58 is closed. The capacitor bank 56 upon closing of the switch 51 is discharged through a resistance or impedance means 59 representing the resistance of the circuit 50 and through the magnetic coil means 48. Typical magnetic force resulting from release of energy from the capacitor bank 56 produces a magnetic field surrounding the magnetic forming coil 48 in a range between six and fifteen kilojoules for example. Differing values of magnetic force are required from different sizes of capacitor banks for smaller and larger diameter machines or stator frame assemblies of motors subjected to such banding. As is known by those skilled in the magnetic forming art, eddy currents are formed in the banding or ring means 40 having a magnetic field thereabout that is opposed to the primary field of the magnetic coil forming means 48. Accordingly, substantially instantaneously the banding or ring means 40 is uniformly deformed radially inwardly to form depressions and complementary pockets that receive the abutments 41 and 42 in tight engagement therewith while forcing the banding or ring means 40 into the outer periphery and surfacing of the laminated stator core 11 as interlocking therewith. The banding or ring means 40 is so intimately in contact that if steel is used for example a gain of substantially 10 watts less power loss is realized since appreciably little if any air gap remains between the banding 40 and outer periphery of the laminated stator core 11. Irregularity of inner peripheral surfacing 40i of the banding occurs as represented in FIGURE 3 of the drawings. Also the banding 40 has a radially inwardly deflected portion 40d between the abutments 41 and 42 at each of the juxtaposed juncture locations. In effect, the banding or ring means 40 is so tightly forced into engagement with the rough peripheral edging of the magnetic stator core as to effect a good seal and mechanical connection without undesirably tearing or ripping the banding and without subjecting any of the motor components to any undesirable twisting movements and the like that might misalign the internally located components. Thus the rough outer peripheral edging of the laminated stator core 11 in locations arcuately between the junctures 41j and 42j will have a smoothly covered surfacing. The deforming of the metal banding or ring means 40 also holds the laminations per se tightly in place in radially outwardly locations. The shoulder means 41s and 42s are located axially on opposite sides of the laminations. It is to be understood that the magnetically formed banding 40 is usable both with or without a flat portion such as due to edging 11f on one side. The banding or ring means 40 also is capable of being provided with a width axially greater than that of the lamination stack up per se such that opposite edging of the banding is deformed radially inwardly on opposite lamination sides at locations axially remote from each other. In some instances, the laminations per se are notched radially inwardly for alignment purposes and banding or ring means 40 will conform to such notching additionally to maintain alignment of laminations.

In magnetic forming, electrical energy in the form of a magnetic field is converted directly into useful work for forming metal parts. By discharging the capacitor bank 56 through the coil 48 over a period of a few microseconds, pulsed magnetic fields having fluxed densities as high as 300,000 gauss are readily produced. This corresponds to magnetic pressures of over 50,000 pounds per square inch. Sequence of operation in the magnetic forming process involves electrical energy from a high voltage power supply being stored in the capacitor or capacitor bank 56. The capacitor means is then discharged rapidly through the magnetic coil 48. The rapid discharge through the coil establishes a changing high intensity magnetic field in the vicinity of the coil, which in turn induces the eddy currents in any work piece of conductive material that is placed in or around the coil. The induced current then interacts with the magnetic field of the coil, resulting in a force that tends to push the work piece or banding 40 away from the coil. Condensers as well as magnetic forming equipment are commercially available. In applying magnetic forming, the magnetic field is produced with a pulse duration time so short that the depth of penetration of the field into the work piece is small compared to wall thickness of the work piece or banding 40. In the absence of a magnetic field within the work piece or banding 40, a net pressure equal to field energy density is exerted on the work piece. As the work piece or banding 40 is compressed, the expanding magnetic field gives up energy to perform the work. Since most metals are not perfect conductors at working temperatures, the magnetic pressure cannot be maintained at the surface of the work piece or banding 40 for a long period of time. The magnetic field gradually leaks through the work piece at a rate determined by the resistivity of the metal, so that finally the external field pressure is balanced by the internal pressure and net force is reduced to zero. The net magnetic pressure that is developed on the work piece is equal to the magnetic pressure on the outside of the work piece minus the magnetic pressure on the inside. This net magnetic pressure produces a stress in the work piece. In order for metal forming to take place, the stress produced must exceed the yield stress of work piece.

The triangular or delta-shaped end frame structure formed by struts per se having open space therebetween exclusively is such that considerable rigidity and strength is provided without metal therebetween. The three point suspension or banding accomplished as to the junctures is advantageous also for mounting purposes. Three points of mounting and/or suspension permit reduced tangential diameter around the circumference in placement of a dynamoelectric machine or motor as to an appliance for laundry equipment and the like. Also in refrigeration units the reduced size of the motor means in which only strut portions form the end frames is appreciable together with the advantage of adequate cooling and ventilation provided by the considerable open spacing between the strut portions. In FIGURE 6, there is shown another mounting for a motor means generally indicated by numeral 110 having a laminated magnetic stator core 111 as well as windings 112 therewith. A rotor 114 has a cast metal squirrel cage winding with integral end ring means 115 as well as cooling fins 116. A shaft 117 is suitably journalled as to sleeve bearing means 118. The end frame means include main strut portions 141u as well as intermediate strut portions 141i which extend radially outwardly from hub means 141h. A metal banding or ring means 140 is provided around peripheral edging of the laminated stator core 111 as well as to enclose and tightly engage radially outwardly extending abutments 141 and 142 similar to those noted previously. Junctures 141j and 142j are formed and interconnected by web means 141w subject to die casting of axial extensions 141e from which threaded mounting lugs 143 project. These mounting lugs 143 have a splined shank 144 and a head 145 integral therewith as represented in FIGURE 7.

In FIGURE 8 an additional end frame means is illustrated also involving threaded lugs indicated by reference numeral 243 around axial extensions 241e cast integrally with webs 241w. A banding 240 is magnetically formed around a laminated magnetic stator core 211 having windings 212 thereon. A plurality of strut portions 241U collectively form triangular-shaped corners such that four instead of three threaded mounting lugs 243 are provided. Intermediate struts 241i extend radially outwardly from a central hub portion 241h cast integrally therewith. The intermediate strut portions 241i extend radially outwardly in substantially diametrically opposite directions and collectively add rigidity to the squared end frame means illustrated in FIGURE 8. It is to be understood that the end frame means shown in FIGURE 8 have junctures and abutments similar to those illustrated in FIGURE 4 of the drawings.

The mounting lugs with threaded ends thereof projecting from end frame means in one direction axially are die cast into interlock with triangular corners of end frame structure. A range of between three and four such mounting lugs is provided in accordance with whether triangular or squared end frame structure with strut portions is provided. Less weight of aluminum or cast metal is used for a three-spoke or strut design than for the squared or four spoke or strut structure of FIGURE 8. In any event, the end frames are machined as to hub portions for concentricity during rotor journalling as well as for the shoulders such as 41s and 42s for proper alignment of the end frame structure on opposite sides of the laminated magnetic core 11, 111, or 211. Concentricities for installation of bearings are maintained for stator and rotor components. Irregularity of the outer peripheral edges of individual laminations of the stator components complement the magnetically formed banding or ring means 40, 140 and 240.

While the embodiments of the present invention as herein disclosed constitute preferred forms, it is to be understood that other forms might be adopted.

What is claimed is as follows:

1. A stator frame assembly for a magnetic core having windings carried therewith, comprising, a pair of end frames each including a plurality of stabilizing strut portions which have open space for cooling ventilation therebetween, predetermined junctures of said strut portions having juxtaposed positioning in locations radially outwardly on the magnetic core, and a metal banding having interlock fit complementary to said junctures as well as to periphery of the magnetic core directly.

2. The assembly of claim 1 wherein each juncture has a radially inner shoulder portion in tight complementary fit to said magnetic stator core.

3. The assembly of claim 1 wherein said metal banding is displaced radially inwardly between said juxtaposed junctures and said abutments thereof to prevent radial and axial displacement of said end frames.

4. The assembly of claim 1 wherein said strut portions include triangular arrangement of outer U-shaped struts as well as intermediate struts also to said junctures though located radially of a central hub portion integrally cast with each of said pair of end frames.

5. The assembly of claim 1 wherein said strut portions include squared arrangement of outer U-shaped struts that collectively define triangular cornering as well as intermediate struts also to said junctures though located radially of a central hub portion integrally cast with each of said pair of end frames.

6. The assembly of claim 4 wherein three threaded mounting lugs project axially from predetermined web portions cast integrally with said strut portions at predetermined locations.

7. The assembly of claim 6 wherein four threaded mounting lugs project axially from predetermined web portions cast integrally with said strut portions at predetermined locations.

References Cited

UNITED STATES PATENTS

| | | | |
|---|---|---|---|
| 2,792,512 | 5/1957 | Koch | 310—258 |
| 3,023,332 | 2/1962 | St. Charles | 310—254 |
| 3,145,313 | 8/1964 | Tupper | 310—42 |
| 3,300,666 | 1/1967 | Frazier et al. | 310—42 |

MILTON O. HIRSHFIELD, *Primary Examiner.*

R. W. TEMPLETON, *Assistant Examiner.*